(12) United States Patent
Schuette

(10) Patent No.: US 7,983,860 B2
(45) Date of Patent: Jul. 19, 2011

(54) METHOD AND SYSTEM FOR MONITORING POWER CONSUMPTION OF A COMPUTER COMPONENT

(75) Inventor: Franz Michael Schuette, Colorado Springs, CO (US)

(73) Assignee: OCZ Technology Group, Inc., San Jose, CA (US)

( * ) Notice: Subject to any disclaimer, the term of this patent is extended or adjusted under 35 U.S.C. 154(b) by 834 days.

(21) Appl. No.: 11/938,343

(22) Filed: Nov. 12, 2007

(65) Prior Publication Data

US 2008/0115001 A1 May 15, 2008

Related U.S. Application Data

(60) Provisional application No. 60/865,182, filed on Nov. 10, 2006.

(51) Int. Cl.
*G01R 21/00* (2006.01)
(52) U.S. Cl. .......................................................... 702/60
(58) Field of Classification Search ...................... 702/60
See application file for complete search history.

(56) References Cited

U.S. PATENT DOCUMENTS

| | | | | |
|---|---|---|---|---|
| 5,708,819 A * | 1/1998 | Dunnihoo | | 713/323 |
| 5,811,966 A * | 9/1998 | Lee | | 324/157 |
| 6,367,023 B2 * | 4/2002 | Kling et al. | | 713/340 |
| 6,476,729 B1 * | 11/2002 | Liu | | 340/870.11 |
| 6,564,332 B1 * | 5/2003 | Nguyen et al. | | 713/340 |
| 7,043,380 B2 * | 5/2006 | Rodenberg et al. | | 702/62 |

* cited by examiner

*Primary Examiner* — Cindy Hien-Dieu Khuu
(74) *Attorney, Agent, or Firm* — Hartman & Hartman, P.C.; Gary M. Hartman; Domenica N. S. Hartman

(57) ABSTRACT

A system (10) and method for monitoring power consumption of a computer system component, such as a central processing unit (CPU), of a desktop computer system. The component is supplied with supply power from a power supply unit (22) of the computer through a power supply cable (14). A coupling (12) is disposed between the power supply unit (22) and a substrate (e.g., motherboard) on which the component is mounted, and is electrically connected to at least one power supply line (18) of the power supply cable (14) and a power supply connector (24) on the substrate (20). The power supply line (18) carries a supply voltage, and one or more devices (26,34,36,46) associated with the coupling (12) determine current flow through the power supply line (18) and provide a power consumption reading for the component based on the supply voltage and the current flow through the power supply line (18).

24 Claims, 2 Drawing Sheets

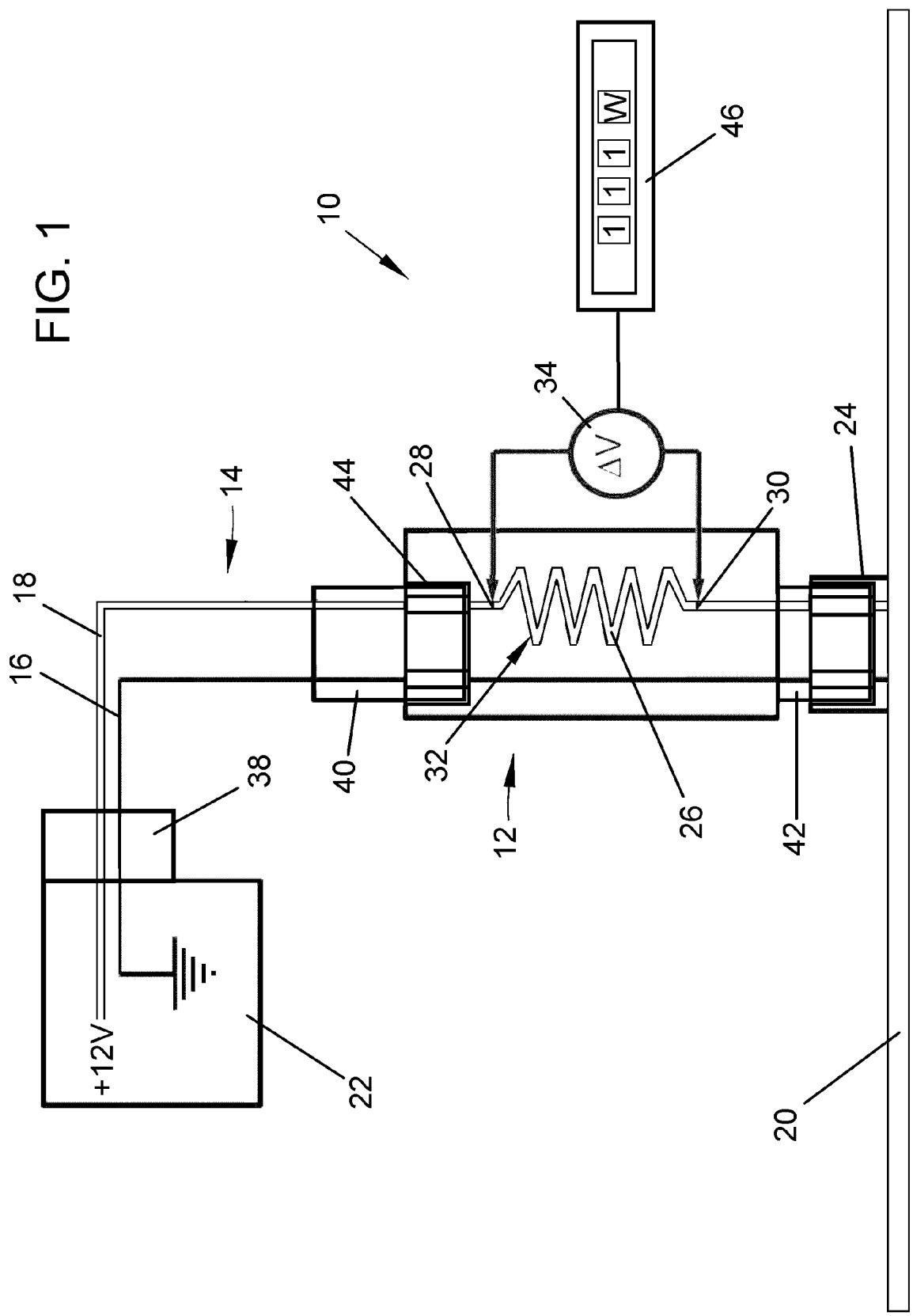

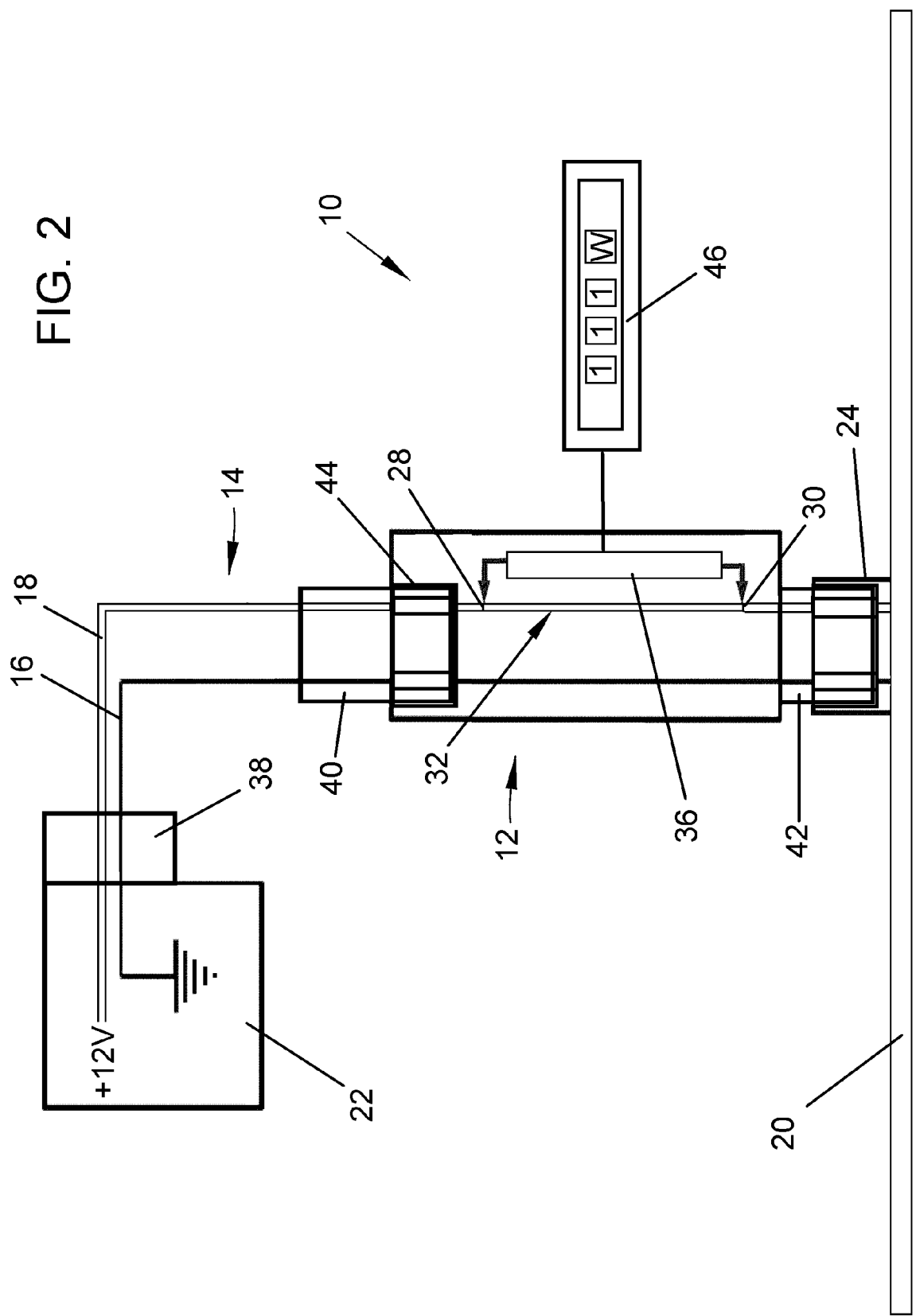

US 7,983,860 B2

METHOD AND SYSTEM FOR MONITORING POWER CONSUMPTION OF A COMPUTER COMPONENT

This application claims the benefit of U.S. Provisional Application No. 60/865,182, filed Nov. 10, 2006, the contents of which are incorporated herein by reference.

BACKGROUND OF THE INVENTION

The present invention generally relates to computers. More particularly, this invention relates to methods and systems for monitoring power consumption of computer components, such as a central processing unit (CPU) of a desktop computer.

Central processing units (CPUs) have evolved over the last decades from relatively simple RISC or x86 processors with a single execution unit to hyperscalar processing units featuring several instances of separate arithmetic logic units and floating point units, decoders and schedulers. In addition, almost all current midrange to high-end processors feature several layers of integrated cache memory comprised mostly of on-die SRAMs. Recent developments have further placed the memory controller onto the processor die. Within the last year, the microprocessor industry has also seen the emergence of multicore processors, that is, the combination of several complete processors into a single package for advanced parallel processing of multiple threads.

It is understood that such evolution of microprocessors incurs cost with regards to the number of transistors per processor. The latest Intel® "Kentsfield" quad core features no less than 582 million transistors. Moreover, clock speed of microprocessors has increased about 50× over the past decade. Increased transistor count along with increased clock speed translates into increased thermal dissipation as well. Therefore, a substantial amount of effort and research has gone into power and thermal management of CPUs. Some measures have involved software-based throttling on the level of the operation system, and others are embedded within the Basic Input/Output System (BIOS).

A prerequisite for successful power management is the understanding of where and under what circumstances most of the power is being consumed. This understanding, however, cannot be achieved without acquisition and analysis of power consumption-related data. On the system level, this can be done through power meters interposed between the wall outlet and the computer's power supply unit. However, this method does not take into account the different loads on the individual system components and can only generate a summary report. On the other hand, for targeted, specific monitoring of the power consumption of, for example, the CPU, this method is not suitable because all other system components, including the power supply's efficacy, mask the real power consumption of the CPU itself.

Currently, power monitoring is predominantly done on the system level through devices like Seasonic's Power Angel or Extech 380308 Power Analyzer. In mobile applications (e.g., notebooks, laptops, PDAs, etc.), power consumption is sometimes monitored using specific software to interface with current sensors. On the desktop level, so far, no easy way exists to monitor specifically the isolated power consumption of the CPU as a function of load.

In view of the above, it would be desirable if it were possible to monitor specifically the isolated power consumption of a desktop CPU (or like motherboard device) as a function of load. Exactly this kind of monitoring is pivotal for an optimal configuration of the computer hardware as well as the optimal load balancing between several computers for the purpose of the most energy-efficient operation of all computer systems. This is true especially in server and workstation environments. In addition, even for a single user, monitoring of the CPU power consumption may give some valuable information about background processes that are using an excess of power.

BRIEF SUMMARY OF THE INVENTION

The present invention provides a system and method suitable for monitoring power consumption of a central processing unit (CPU) or other power-consuming component of a desktop computer system.

According to a first aspect of the invention, a computer system component mounted on a substrate is supplied with supply power from a power supply unit of the computer through a power supply cable, and the system includes a coupling disposed between the power supply unit and the substrate and electrically connected to at least one power supply line of the power supply cable and a power supply connector on the substrate. The at least one power supply line carries a supply voltage, and one or more devices associated with the coupling determine current flow through the at least one power supply line and provides a power consumption reading for the component based on the supply voltage and the current flow through the at least one power supply line.

According to a second aspect of the invention, the method entails supplying a computer system component mounted on a substrate with supply power from a power supply unit of the computer through a power supply cable, and placing a coupling between the power supply unit and the substrate so that the coupling is electrically connected to at least one power supply line of the power supply cable and a power supply connector on the substrate. With the at least one power supply line carrying a supply voltage, current flow through the at least one power supply line is determined, and a power consumption reading for the component is generated based on the supply voltage and the current flow through the at least one power supply line.

According to certain preferred aspects of the invention, multiple power supply lines are consolidated within the coupling into a single conductor, through which current flow is determined. A resistor can be combined with the conductor, across which a voltage differential is measured to determine current flow through the power supply lines. Alternatively, the coupling may include a Hall effect transducer adapted to sense current flow through the power supply line(s).

In view of the above, it can be seen that a significant advantage of this invention is that it provides a system and method for monitoring the isolated power consumption of a CPU, as well as other computer system components. The system and method enable one to optimize the hardware configuration of a computer, as well as optimize load balancing between several computers for the purpose of energy-efficient operation of several computer systems in, for example, a server or workstation environment.

Other objects and advantages of this invention will be better appreciated from the following detailed description.

BRIEF DESCRIPTION OF THE DRAWINGS

FIG. 1 is a schematic view of a metering system for monitoring power consumption of a central processing unit on a computer motherboard, in which a coupling is interposed between a power supply cable to the motherboard and an auxiliary power connector on the motherboard in accordance with a first embodiment of this invention.

FIG. 2 is a schematic view of a metering system for monitoring power consumption of a central processing unit, in which a Hall effect transducer is used in accordance with a second embodiment of this invention.

DETAILED DESCRIPTION OF THE EMBODIMENT

The present invention takes advantage of the fact that increased power consumption of recent CPUs has resulted in CPUs being provided with power through power supply lines that are separate from the remainder of the computer system power. Generally, before the emergence of the Intel® Pentium® 4, CPU power was usually derived from either the 3.3V or the 5V rail supplied through AT or ATX power connectors. The increased power demand of the Pentium® 4 led to the use of dedicated supply lines at higher voltages, typically dedicated 12V auxiliary power supply lines, to power the CPU. Currently most CPU and motherboard designs use processor power circuitry electrically isolated from the rest of the motherboard's power and ground planes.

According to the present invention, the separation of the CPU supply power from other power and ground planes on the motherboard permits the use of the present invention, which entails monitoring the CPU's power consumption by measuring current flow through dedicated power supply lines (typically 12V) to the CPU. It should be noted that CPUs typically receive a constant voltage supply level appropriate for the particular CPU from a voltage regulator module (VRM) on the motherboard. Though the efficacy of a given VRM is not precisely defined, VRM efficacy is generally believed to be on the order of about 70 to 80%, which is sufficiently precise for purposes of implementing the present invention.

FIGS. 1 and 2 schematically represent two embodiments of the invention encompassing a metering system 10 that makes use of a coupling 12 installed on a dedicated power supply cable 14 to a CPU (not shown) on a computer motherboard 20. The power supply cable 14 is typically designated the auxiliary power supply cable of the computer's power supply unit (PSU) 22, and carries one or more ground lines 16 and one or more power supply lines 18, typically at least some of which provide supply voltages of 12V. The motherboard 20 is conventionally equipped with an auxiliary power supply connector 24 (for example, a 20-pin ATX or 24-pin EPS connector), from which power from the power supply lines 18 is typically routed to the VRM (not shown) and then the CPU on the motherboard 20. The different embodiments of FIGS. 1 and 2 will be described in more detail below, with consistent reference numbers used to identify the same or equivalent components where appropriate.

With knowledge of the supply voltage delivered by the supply lines 18 to the CPU, the invention monitors current flow through the supply lines 18 in order to compute CPU power consumption. A first and readily uncomplicated approach is schematically represented in FIG. 1, which represents the coupling 12 as containing a resistor 26 placed in electrical series with the power supply lines 18. For this purpose, the incoming supply lines 18 are consolidated to form a single conductor 32, a portion having a precisely defined resistance so as to constitute a resistor 26. The measured voltage drop across the resistor 26 can be converted into current flow according to Ohm's law. As shown, the coupling 12 can be configured as a separate add-on unit with a plug 42 that plugs directly into the auxiliary power supply connector 24 on the motherboard 20, and a connector 44 into which the auxiliary power plug 40 of the cable 14 is plugged. Alternatively, the coupling 12 can be integrated into the auxiliary power plug 40 of the cable 14, in which case the coupling 12 is effectively a component of the PSU 22.

The resistor 26 is preferably a relatively low Ohm resistor, for example, about 0.01 to 0.05 Ohm, as to minimize the voltage drop in the supply power to the CPU. Based on Ohm's law, $V=IR$, it can be understood that a 5 Amp current flowing through the power supply lines 18 would result in a measurable 0.05V drop across the resistor 26, which is easily tolerated by the CPU VRM yet can still be accurately be sensed. The 50 mV differential can be measured across two test points 28 and 30 located at or adjacent opposite ends of the resistor 26 and sensed by a voltmeter 34 (such as an analog-digital (AD) converter) or other suitable voltage sensor associated with the coupling 12. With knowledge of the supply voltage on the power supply lines 18, the differential across the test points 28 and 30 can be monitored and used to reliably calculate the total power going to the CPU based on the equation, $P=IV$, in which I is the calculated current through the resistor 26, V is the supply voltage, and P is the power consumption in Watts. As noted above, the CPU power consumption can be more accurately calculated by further factoring in the efficacy of the VRM. The voltmeter 34 or other suitable processing unit can be adapted to convert and display the power consumption of the CPU. For example, the voltmeter 34 can be connected to a digital display 46 configured to be installed in a drive bay, or implemented in any other manner suitable for a desktop computer. Alternatively, the display 46 could incorporate circuitry to also perform the measuring and conversion functions of the voltmeter 34.

In the second embodiment of FIG. 2, the resistor 26 and voltmeter 34 are replaced with a Hall effect transducer 36 placed adjacent to the conductor 32. The Hall effect transducer 36 connects to test points 28 and 30 at opposite ends of the conductor 32 within the coupling 12. In accordance with known Hall effect principles, the transducer 36 generates a voltage in response to the magnetic field produced by the conductor 32 that varies with current, and therefore does not affect current flow or produce a voltage drop through the conductor 32. Hall effect current transducers are commercially available from a wide variety of sources, with a common output signal being about 1 mV per 1 A of sensed current. If low currents flow through the power supply lines 18, the relatively low sensitivity typically associated with the Hall effect transducers can be addressed at least in part by looping the conductor 32 several times through the transducer 36, in which case the number of loops will directly multiply the voltage output of the transducer 36. In any event, current flow through the conductor 32 can be determined based on the output of the transducer 36, and with knowledge of the supply voltage on the power supply lines 18, the total power going to the CPU can be reliably calculated in the same manner described above for the first embodiment. The power consumption of the CPU can then be displayed on a suitable display 46.

In order to counteract voltage drops on the supply lines 18 that may occur at high loads, FIG. 1 shows the PSU 22 as being equipped with a load compensation device 38 to maintain a constant voltage output at the auxiliary connector 24.

From the above, the present invention can be seen to provide several advantages, most notably, the ability to accurately isolate and monitor CPU power consumption with hardware that is both inexpensive and uncomplicated to implement. It should be noted that essentially the same equipment and method described above can be used to monitor the power consumption of other computer system components with dedicated supply power, including but not limited to graphics processors (GPUs) and graphics cards featuring on-board memory and a graphics processor. As such, the invention is not limited to monitoring the power consumption of a CPU on a motherboard, but can be applied to a variety of other components that may be mounted to any suitable circuit board or substrate equipped with appropriate connections to a power supply of a computer.

In view of the above, while the invention has been described in terms of specific embodiments, it is apparent that other forms could be adopted by one skilled in the art. Furthermore, the functions of certain components could be performed by components of different construction but capable of a similar (though not necessarily equivalent) function, and the coupling 12 could differ in appearance and construction from the embodiment schematically represented in the Figures. Therefore, the scope of the invention is to be limited only by the following claims.

The invention claimed is:

1. A system (10) for monitoring power consumption, the system (10) comprising:
 a computer system component on a substrate (20) of a computer, the computer system component being supplied with supply power from a power supply unit (22) of the computer through a power supply cable (14):
 a coupling (12) disposed between the power supply unit (22) and the substrate (20), the coupling (12) being electrically connected to at least one power supply line (18) of the power supply cable (14) and connected with a plug (42) to a power supply connector (24) on the substrate (20), the at least one power supply line (18) carrying a supply voltage;
 means (26,34,36) contained within the coupling (12) for determining current flow through the at least one power supply line (18); and
 means (34,46) for generating a power consumption reading for the computer system component based on the supply voltage and the current flow through the at least one power supply line (18).

2. The system (10) according to claim 1, wherein the power supply cable (14) comprises a power plug (40) and the coupling (12) is integrated into the power plug (40) and is a component of the power supply unit (22).

3. The system (10) according to claim 1, wherein the coupling (12) is configured as a separate add-on unit comprising:
 a connector (44) adapted to receive a plug (40) of the power supply cable (14); and
 the plug (42) adapted for plugging the coupling (12) into the power supply connector (24) on the substrate (20).

4. The system (10) according to claim 1, wherein the generating means (34,46) comprises means (46) for displaying the power consumption reading.

5. The system (10) according to claim 4, wherein the displaying means (46) is configured for installation in a drive bay of the computer.

6. The system (10) according to claim 1, wherein the supply voltage carried by the at least one power supply line (18) is an auxiliary power supply of the power supply unit (22) and is in excess of five volts.

7. The system (10) according to claim 1, further comprising a load compensation device (38) that counteracts voltage drops in the power supply line (18) by maintaining a constant voltage output for the power supply unit (22).

8. A system (10) for monitoring power consumption, the system (10) comprising:
 a computer system component on a substrate (20) of a computer, the computer system component being supplied with supply power from a power supply unit (22) of the computer through a power supply cable (14);
 a coupling (12) disposed between the power supply unit (22) and the substrate (20), the coupling (12) being electrically connected to at least one power supply line (18) of the power supply cable (14) and a power supply connector (24) on the substrate (20), the at least one power supply line (18) carrying a supply voltage;
 means (26,34,36) associated with the coupling (12) for determining current flow through the at least one power supply line (18); and
 means (34,46) for generating a power consumption reading for the computer system component based on the supply voltage and the current flow through the at least one power supply line (18);
 wherein the at least one power supply line (18) comprises a plurality of power supply lines (18) within the power supply cable (14), and the plurality of power supply lines (18) are consolidated to form a conductor (32) within the coupling (12).

9. The system (10) according to claim 8, wherein the determining means (26,34) comprises a resistor (26) within the coupling (12) and in series with the conductor (32).

10. The system (10) according to claim 9, wherein the resistor (26) has oppositely-disposed end points (28,30), and the determining means (26,34) comprises means (34) for measuring a voltage drop across the end points (28,30).

11. The system (10) according to claim 8, wherein the determining means (36) comprises a Hall effect transducer (36) within the coupling (12) and adapted to sense current flowing through the conductor (32).

12. A method of monitoring power consumption, the method comprising:
 supplying power to a computer system component on a substrate (20) of a computer with a power supply unit (22) of the computer through a power supply cable (14);
 placing a coupling (12) between the power supply unit (22) and the substrate (20) so that the coupling (12) is electrically connected to at least one power supply line (18) of the power supply cable (14) and connected with a plug (42) to a power supply connector (24) on the substrate (20), the at least one power supply line (18) carrying a supply voltage;
 determining current flow through the at least one power supply line (18) with at least one electrical device (26, 34,36) contained within the coupling (12); and
 generating a power consumption reading for the computer system component based on the supply voltage and the current flow determined with the at least one electrical device (26,34,36).

13. The method according to claim 12, wherein the placing step comprises inserting the plug (42) in the power supply connector (24) of the substrate (20).

14. The method according to claim 12, wherein the at least one power supply line (18) comprises a plurality of power supply lines (18) within the power supply cable (14), and the coupling (12) consolidates the plurality of power supply lines (18) to form a conductor (32) within the coupling (12).

15. The method according to claim 14, wherein the at least one electrical device (26,34,36) of the determining step comprises a resistor (26) within the coupling (12) and in series with the conductor (32).

16. The method according to claim 15, wherein the resistor (26) has oppositely-disposed end points (28,30), and the determining step comprises measuring a voltage drop across the end points (28,30).

17. The method according to claim 14, wherein the at least one electrical device (26,34,36) of the determining step comprises a Hall effect transducer (36) within the coupling (12) and adapted to sense current flowing through the conductor (32).

18. The method according to claim 12, wherein the placing step comprises inserting a plug (40) of the power supply cable (14) into a connector (44) of the coupling (12), and inserting the plug (42) of the coupling (12) into the power supply connector (24) on the substrate (20).

19. The method according to claim 12, further comprising displaying the power consumption reading on a display means (46).

20. The method according to claim 19, wherein the displaying step comprises installing the display means (46) in a drive bay of the computer.

21. The method according to claim 12, wherein the supply voltage carried by the at least one power supply line (18) is an auxiliary power supply of the power supply unit (22) and is in excess of five volts.

22. The method according to claim 12, further comprising counteracting voltage drops in the power supply line (18) with a load compensation device (38) that maintains a constant voltage output for the power supply unit (22).

23. The method according to claim 12, further comprising employing the power consumption reading to optimize a hardware configuration of the computer.

24. The method according to claim 12, further comprising employing the power consumption reading to optimize load balancing between the computer and at least one other computer.

* * * * *